United States Patent
Wang et al.

(10) Patent No.: US 11,668,928 B2
(45) Date of Patent: Jun. 6, 2023

(54) DIFFRACTIVE OPTICAL ELEMENT CAPABLE OF BEING USED FOR PROJECTING OBLIQUE LINE, PROJECTION APPARATUS, AND DESIGN METHOD THEREFOR

(71) Applicant: Jiaxing UPhoton Optoelectronics Technology Co., Ltd., Zhejiang (CN)

(72) Inventors: Yiyan Wang, Zhejiang (CN); Kehan Tian, Zhejiang (CN)

(73) Assignee: Jiaxing UPhoton Optoelectronics Technology Co., Ltd., Jiaxing (CN)

( * ) Notice: Subject to any disclaimer, the term of this patent is extended or adjusted under 35 U.S.C. 154(b) by 0 days.

(21) Appl. No.: 17/790,255

(22) PCT Filed: Dec. 18, 2020

(86) PCT No.: PCT/CN2020/137490
§ 371 (c)(1),
(2) Date: Jun. 30, 2022

(87) PCT Pub. No.: WO2021/135981
PCT Pub. Date: Jul. 8, 2021

(65) Prior Publication Data
US 2023/0080395 A1    Mar. 16, 2023

(30) Foreign Application Priority Data
Dec. 31, 2019   (CN) .......................... 201911410674.8

(51) Int. Cl.
*G02B 27/00*   (2006.01)
*G02B 27/42*   (2006.01)

(52) U.S. Cl.
CPC ..... *G02B 27/0012* (2013.01); *G02B 27/4233* (2013.01)

(58) Field of Classification Search
CPC ............ G02B 27/0012; G02B 27/4233; G02B 27/00; G02B 27/425; G02B 27/4255; G02B 30/33; G02B 27/42; F21V 99/00
See application file for complete search history.

(56) References Cited

U.S. PATENT DOCUMENTS

| | | | |
|---|---|---|---|
| 7,686,223 B2 * | 3/2010 | Vinogradov | G02B 27/20 235/462.41 |
| 2002/0104886 A1 * | 8/2002 | Martin | G06K 7/10891 235/462.45 |

(Continued)

FOREIGN PATENT DOCUMENTS

| | | |
|---|---|---|
| CN | 1713208 A | 12/2005 |
| CN | 1977275 A | 6/2007 |

(Continued)

OTHER PUBLICATIONS

English translation of International Search Report and Written Opinion issued in PCT/CN2020/137490, dated Mar. 22, 2021.

(Continued)

*Primary Examiner* — Bao Q Truong
(74) *Attorney, Agent, or Firm* — Meunier Carlin & Curfman LLC

(57) ABSTRACT

Provided is a design method for a diffractive optical element for being used for projecting an oblique line. The method comprises: determining an angle θ between an oblique line and a first direction (S101); according to the angle, determining a first cycle d1 of a diffractive optical element in the first direction and a second cycle d2 of the diffractive optical element in a second direction, wherein the first direction is perpendicular to the second direction, and the first cycle d1 and the second cycle d2 satisfy tgθ=d1/d2 (S102); and obtaining a phase distribution map of the diffractive optical element according to the first cycle d1, the second cycle d2 and a target pattern with an oblique line at 45° (S103). By means of the design method, the visual effect of an optical field projected by means of a diffractive optical element can be improved.

14 Claims, 6 Drawing Sheets

(56) References Cited

U.S. PATENT DOCUMENTS

| | | |
|---|---|---|
| 2005/0279834 A1 | 12/2005 | Kitazumi |
| 2005/0284942 A1 | 12/2005 | Gurevich et al. |
| 2020/0409172 A1* | 12/2020 | Fattal .................... G02B 30/33 |
| 2021/0368158 A1* | 11/2021 | Fattal .................... G02B 30/33 |

FOREIGN PATENT DOCUMENTS

| | | |
|---|---|---|
| CN | 101401107 A | 4/2009 |
| CN | 106324854 A | 1/2017 |
| CN | 106842563 A | 6/2017 |
| CN | 106842587 A | 6/2017 |
| CN | 111240009 A | 6/2020 |
| EP | 2624017 A1 | 8/2013 |
| EP | 2879883 B1 | 4/2017 |
| JP | S60150184 A | 8/1985 |
| WO | 03009225 A2 | 1/2003 |
| WO | 2016154218 A1 | 9/2016 |
| WO | 2019177617 A1 | 9/2019 |

OTHER PUBLICATIONS

Extended European Search Report issued in EP 20909067.9, dated Dec. 20, 2022.
Communication pursuant to Article 94(3) EPC, issued in EP 20909067.9, dated Jan. 9, 2023.

\* cited by examiner

```
                                    100
┌─────────────────────────────────────────────────────────────┐
│                           S101                              │
│   determine an angle θ between an oblique line and a first  │
│                         direction                           │
└─────────────────────────────────────────────────────────────┘
                                │
                                ▼
┌─────────────────────────────────────────────────────────────┐
│                           S102                              │
│  according to the angle, determine a first cycle d1 of a    │
│  diffractive optical element in the first direction and a   │
│  second cycle d2 of the diffractive optical element in a    │
│  second direction, wherein the first direction is           │
│  perpendicular to the second direction, and the first       │
│  period d1 and the second period d2 satisfy tg θ =d1/d2     │
└─────────────────────────────────────────────────────────────┘
                                │
                                ▼
┌─────────────────────────────────────────────────────────────┐
│                           S103                              │
│  obtain a phase distribution map of the diffractive optical │
│  element according to the first period d1, the second       │
│  period d2 and a target map with an oblique line at 45°     │
└─────────────────────────────────────────────────────────────┘
```

Fig. 2

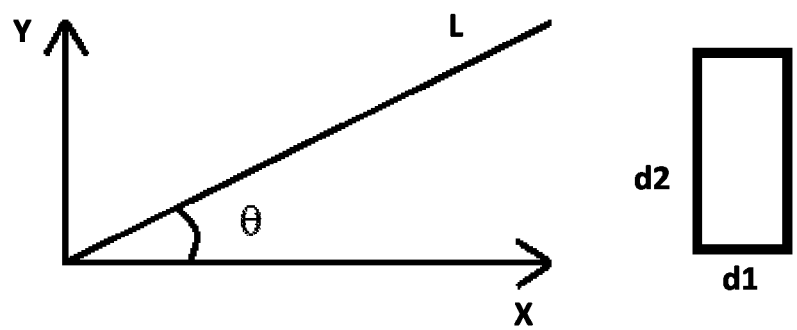

DIFFRACTIVE OPTICAL ELEMENT CAPABLE OF BEING USED FOR PROJECTING OBLIQUE LINE, PROJECTION APPARATUS, AND DESIGN METHOD THEREFOR

This is a 371 U.S. national stage application of PCT International Patent Application No. PCT/CN2020/137490, filed Dec. 18, 2020, entitled "DIFFRACTIVE OPTICAL ELEMENT CAPABLE OF BEING USED FOR PROJECTING OBLIQUE LINE, PROJECTION APPARATUS, AND DESIGN METHOD THEREFOR," which claims priority to Chinese Patent Application No. CN2019114106748, filed Dec. 31, 2019, each of which is incorporated by reference herein in its entirety.

TECHNICAL FIELD

The invention relates to the technical field of optics, and particularly to a diffractive optical element for projecting an oblique line, a projection apparatus, and a design method thereof.

BACKGROUND ART

According to the traditional design methods, a diffractive optical element is designed in such a manner as to have a plurality of microstructure pattern units arranged in a two-dimensional array, in which each microstructure pattern unit has the same phase distribution pattern, and the cycle of each microstructure pattern unit is square. At the time of designing a diffractive optical element that projects an oblique-line pattern, the linewidth of the projected pattern is required to be as small as possible in some application scenarios, such as a X-shaped indication pattern for use in a laser scanning gun (in particular, a thinner line, oblique but not at 45°, is more desired). Therefore, in the design process of a diffractive optical element, an oblique-line target pattern with only one pixel width will be made at the time of making a target pattern. However, the inventors of the application found that when a diffractive optical element was designed employing a traditional method, if an oblique line (except for at 45°) was drawn with one pixel width, the oblique line would show an obvious sawtooth shape. As shown in FIG. 1, the visual effect of the target pattern as generated is poor, thereby resulting in the poor visual effect of an optical field projected by the designed diffractive optical element.

The contents in the Background Art are merely the technologies known by the inventors, and do not necessarily represent the prior art in the field.

SUMMARY OF THE INVENTION

In view of at least one defect in the prior art, the invention provides a design method for a diffractive optical element for projecting an oblique line, comprising:

determining an angle $\theta$ between the oblique line and a first direction;

determining, according to the angle $\theta$, a first cycle d1 of the diffractive optical element in the first direction and a second cycle d2 of the diffractive optical element in a second direction, wherein the first direction is perpendicular to the second direction; and obtaining a phase distribution map of the diffractive optical element according to the first cycle d1, the second cycle d2 and a target pattern with an oblique line at 45°.

According to one aspect of the invention, the oblique line at 45° is a single-pixel or multi-pixel oblique line.

According to one aspect of the invention, the angle $\theta$ does not equal to 45°.

According to one aspect of the invention, the first cycle d1 and the second cycle d2 satisfy $tg\theta = d1/d2$.

The invention further provides a diffractive optical element for projecting an oblique line, wherein an angle between the oblique line and a first direction is $\theta$, the diffractive optical element comprising:

a plurality of microstructure pattern units cyclically arranged in the first direction and a second direction, wherein the first direction is perpendicular to the second direction, a cycle of the microstructure pattern units in the first direction is d1, a cycle of the microstructure pattern units in the second direction is d2, and the first cycle d1 and the second cycle d2 are determined according to the angle, wherein a phase distribution map of the diffractive optical element is designed according to the first cycle d1, the second cycle d2 and a target pattern with an oblique line at 45°.

According to one aspect of the invention, the oblique line at 45° is a single-pixel or multi-pixel oblique line.

According to one aspect of the invention, wherein the angle $\theta$ does not equal to 45°.

According to one aspect of the invention, the first cycle d1 and the second cycle d2 satisfy $tg\theta = d1/d2$.

The invention further relates to a projection apparatus, comprising:

a light source configured to emit a light beam;

According to one aspect of the invention, the diffractive optical element is disposed downstream of the light source and receives the light beam, modulates the light beam and projects a pattern comprising an oblique line.

According to one aspect of the invention, the oblique line is a single-pixel or multi-pixel oblique line.

According to one aspect of the invention, the projection apparatus is a laser scanning gun.

The diffractive optical element obtained according to one embodiment of the invention can project an oblique line at any angle without an obvious sawtooth shape, which is uniform in brightness and is arranged in a neat and regular manner to greatly improve the aesthetic thereof.

BRIEF DESCRIPTION OF THE DRAWINGS

The drawings that constitute part of the invention are provided for the purpose of further understanding the invention, and the exemplary embodiments of the invention and description thereof are provided to explain the invention, but do not make any inappropriate limitation of the same. In the drawings:

FIG. 2 shows a flowchart of a design method for a diffractive optical element capable projecting an oblique line according to one embodiment of the invention;

FIG. 3 shows a schematic diagram of a target oblique line and a microstructure pattern unit of a diffractive optical element according to one embodiment of the invention;

DETAILED DESCRIPTION OF THE EMBODIMENTS OF THE INVENTION

Figure 1:
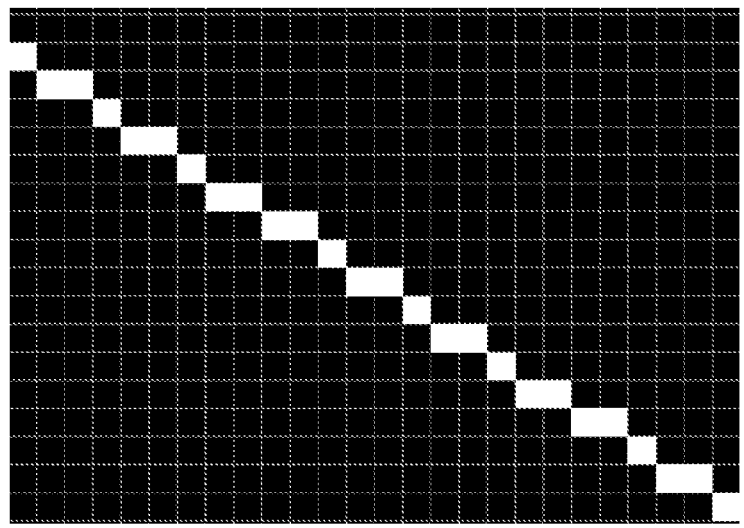
FIG. 1 shows an oblique line projected by a diffractive optical element designed according to the prior art.

Certain exemplary examples will be described below only in a brief manner. Just as those skilled in the art will recognize, modifications in various ways to the examples described herein can be carried out without departing from the spirit or scope of the invention. Therefore, the drawings and the following description are deemed essentially exemplary, instead of limitative.

In the description of the invention, it needs to be understood that the orientation or position relationships denoted by such terms as "central" "longitudinal" "latitudinal" "length" "width" "thickness" "above" "below" "front" "rear" "left" "right" "vertical" "horizontal" "top" "bottom" "inside" "outside" "clockwise" "counterclockwise" and the like are based on the orientation or position as shown in the accompanying drawings, and are used only for the purpose of facilitating description of the invention and simplification of the description, instead of indicating or suggesting that the denoted devices or elements must be oriented specifically, or configured or operated in some specific orientation. Thus, such terms should not be construed to limit the invention. In addition, such terms as "first" and "second" are only used for the purpose of description, rather than indicating or suggesting relative importance or implicitly indicating the number of the designated technical features. Accordingly, features defined with "first" or "second" may, expressly or implicitly, include one or more of such features. In the description of the invention, "plurality" means two or above, unless otherwise defined explicitly and specifically.

In the description of the invention, it needs to be noted that, unless otherwise specified and defined explicitly, such terms as "mount" "link" and "connect" should be understood in broad sense. For example, connection may refer to fixed connection, detachable connection, or integrated connection; also to mechanical connection, electrical connection or intercommunication; further to direct connection, or connection by an intermediary medium; or even to internal communication between two elements or interaction between two elements. For those skilled in the art, they can appreciate the specific meaning of such terms herein in light of the specific circumstances.

Herein, unless otherwise specified and defined explicitly, if a first feature is "above" or "below" a second one, this may cover the case of direct contact between the first and second features, also cover the contact via another feature therebetween, instead of the direct contact. Furthermore, if a first feature "above", "over" or "on the top of" a second one, this may cover the case that the first feature is right above or on the inclined top of the second feature, or just indicate that the first feature has a horizontal height higher than that of the second feature. If a first feature is "below", "under" or "on the bottom of" a second feature, this may cover the case that the first feature is right below and on the inclined bottom of the second feature, or just indicates that the first feature has a horizontal height lower than that of the second feature.

The disclosure below provides many different implementation modes or examples so as to realize different structures described herein. In order to simplify the disclosure of the invention, the following will give the description of the parts and arrangements embodied in specific examples. Surely, they are just for the exemplary purpose, not intended to limit the invention. Besides, the invention may repeat a reference number and/or reference letter in different examples, and such repeat is for the purpose of simplification and clarity, which does not represent any relation among various implementation modes and/or arrangements as discussed. In addition, the invention provides examples of various specific techniques and materials, but those skilled in the art can also be aware of application of other techniques and/or use of other materials.

The preferred embodiments of the invention will be introduced below referring to the drawings. It should be appreciated that the preferred embodiments described herein are only for the purpose of illustrating and explaining, instead of restricting, the invention.

First Aspect

FIG. 2 shows a flowchart of a design method 100 for a diffractive optical element according to one embodiment of the invention, which can be used for designing a diffractive optical element projecting an oblique line. Detailed description will be made below with reference to the drawings.

In step S101, determining an included angle θ between an oblique line to be projected and a first direction.

Refer to FIG. 3, where the oblique line L is the line to be projected, and the first direction is the direction of the X-axis in FIG. 3, thereby determining the included angle θ between the oblique line L and the X-axis direction (the θ does not equal to 45° s, for example). The first direction X may be selected and determined according to the actual situation, for example the horizontal direction or vertical direction on a surface to be projected, or other directions.

In S102, determining, according to the included angle θ, a first cycle d1 of the diffractive optical element in the first direction and a second cycle d2 of the diffractive optical element in a second direction, wherein the first direction is perpendicular to the second direction, and the first cycle d1 and the second cycle d2 satisfy tgθ=d1/d2.

Those skilled in the art easily understand that the plane of the diffractive optical element is usually parallel to the surface to be projected. Therefore, for the convenience of description, the coordinate system and direction used to describe the line to be projected above are also applicable for describing the diffractive optical element. If the plane of the diffractive optical element is not parallel to the surface to be projected, the oblique line on the surface to be projected may be converted to a plane parallel to the diffractive optical element by means of image transformation.

After the first direction is determined, the second direction can be determined, which is perpendicular to the first direction. The second direction is, for example, a direction perpendicular to the first direction on the surface to be projected, for example the direction of the Y-axis shown in FIG. 3.

According to the existing design methods, the cycle of each microstructure pattern unit of a diffractive optical element is square, that is, the cycles in the first direction and the second direction are the same in length terms. Unlike that, adopted in the design method 100 of the invention is a design mode in which the microstructure pattern units have different cycles in the first direction and the second direction, the relationship between them satisfying $tg\theta=d1/d2$, where d1 is the first cycle in the first direction and d2 is the second cycle in the second direction. The right side of FIG. 3 schematically shows a schematic diagram of the size of one of the microstructure pattern units.

Any value may be taken as the first cycle d1, for example 100 um-2 mm. The second cycle d2 is preferably determined according to the relationship of $tg\theta=d1/d2$. However, the invention is not limited to this, and the second cycle d2 may also be determined first, and the first cycle d1 is then determined according to $tg\theta=d1/d2$.

In step S103, obtaining a phase distribution map of the diffractive optical element according to the first cycle d1, the second cycle d2 and the target pattern with an oblique line at 45°.

As those skilled in the art easily understand, when a diffractive optical element is designed with the aid of computer program, a series of parameters need to be input, including the parameters about a target optical field (i.e., the pattern desired to be obtained on the plane to be projected). For example, the input of the parameters of the target optical field can be achieved by means of making a target pattern through the computer program. The computer program can calculate a phase distribution map of the diffractive optical element to be designed according to a series of input parameters based on the iterative Fourier transform algorithm.

The pixel size (i.e., point spacing) of the target optical field may be calculated by a formula of $a=\lambda/d*Z$, where a is a size of pixel (point spacing), k is a wavelength, d is a cycle of the diffractive optical element, and Z is an imaging distance. Therefore, it can be known that the point spacing a is inversely proportional to the cycle of the diffractive optical element, that is, the larger the cycle, the smaller the point spacing of the projected pattern, and vice versa. Thus, by arranging different cycle sizes of the diffractive optical element in the first and second directions can the point spacing of the projected diffraction pattern be enabled to have different sizes in the first and second directions, thereby simulating uniform oblique lines with different angles of inclination.

Since the first cycle d1 and the second cycle d2 themselves preferably have satisfied $tg\theta=d1/d2$, when a diffractive optical element is designed for projecting an oblique line L, it is not necessary to use the oblique line L itself as the target pattern, but a target pattern with an oblique line at 45° may be used instead, so that the oblique line of the target pattern may be arranged in the way of diagonally connecting single pixels at 45°, so as to obtain a target pattern with a relatively uniform and aesthetically pleasing oblique line, thereby designing a diffractive optical element for projecting a uniform and aesthetically pleasing oblique line not at 45°. However, the invention is not limited to the single-pixel case.

In addition, those skilled in the art easily understand that other parameters, such as light source parameters (e.g., wavelength, divergence angle, etc.) and target surface parameters (e.g., working distance), are possible to be further input at the time of designing the phase distribution map of the diffractive optical element. These may be specifically selected and applied according to the actual design scenarios.

Figure 4:
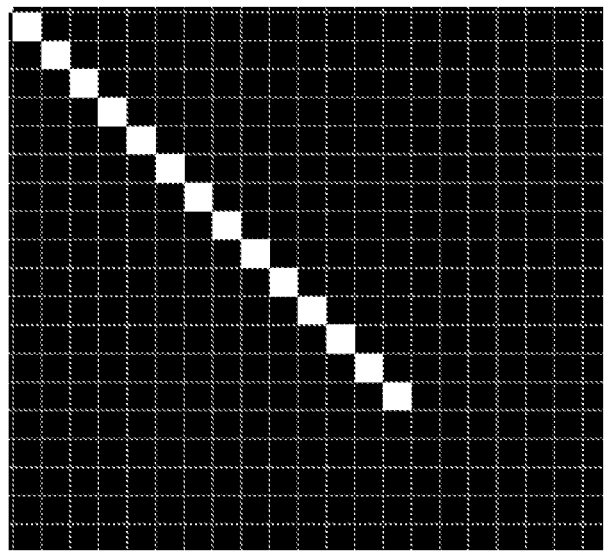
FIG. 4 shows a target pattern with an oblique line at 45°.

FIG. 4 shows a target pattern as made with an oblique line at 45°. As can be seen from the figure, the oblique line at 45° is arranged in the form of a diagonal line to have a regular and aesthetically pleasing shape. The oblique line at 45° may be a single-pixel or multi-pixel oblique line. After the target pattern with the oblique line at 45° is obtained, the phase distribution scheme of the diffractive optical element may be obtained upon computer-aided operation. The oblique line projected by the diffractive optical element designed according to the technical solution of the invention in the target optical field has great improvement in its visual effect.

After the phase distribution map of the diffractive optical element is obtained in the step S103, the parameters of the diffractive optical element are determined, and the subsequent manufacturing and processing may be carried out.

Figure 5:
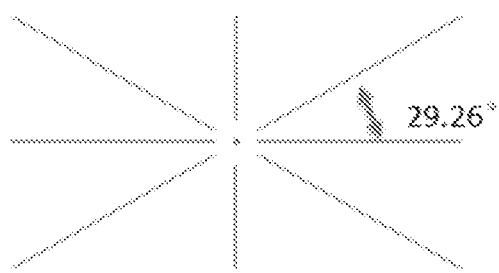
FIG. 5 shows a target optical field according to one embodiment of the invention.
Figure 6:
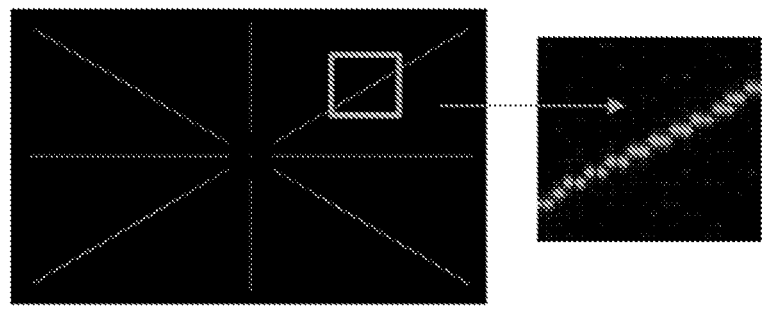
FIG. 6 shows an oblique line projected by a diffractive optical element obtained according to a traditional design method.

By taking FIG. 5 as an example, FIG. 5 is a target optical field, in which the included angle θ between the oblique line to be projected and the first direction (the horizontal direction) is 29.26°, the wavelength of the light source is 650 nm, and the working distance is 100 mm. When a diffractive optical element is designed by means of employing a traditional design method, the cycle of the diffractive optical element is square, the same cycle size d 700 um is selected in the first and second directions, and the target pattern with the oblique line at an angle of inclination of 29.260 as made with single pixel width serves as the input information of the computer-aided program. According to the above pixel size calculation formula, the pixel size of the diffractive optical element on the surface to be projected is 0.093 mm*0.093 mm. The oblique line actually projected onto the surface to be projected by the diffractive optical element obtained by the traditional design method is shown in FIG. 6. After amplification, it can be clearly seen that the oblique line would show an obvious sawtooth shape, which is not uniform in brightness, and the target optical field formed accordingly has poor visual effect.

Figure 7:
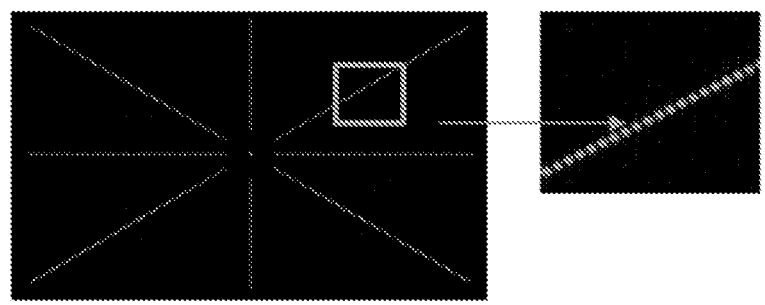
FIG. 7 shows an oblique line projected by a diffractive optical element obtained according to a design method of the invention in one embodiment.

In contrast, when a diffractive optical element is designed by means of employing the design method 100 of the invention, different cycle sizes are selected in first and second directions. Among them, a first cycle d1 is 700 um and a second cycle d2 is 1250 um, both satisfying 700/1250=0.56=tg29.26°, and using a single-pixel width to make a target pattern with an oblique line at an angle of inclination of 45°, which serves as the input information of the computer-aided program. According to the above pixel size calculation formula, by employing the design method of the invention, the pixel size of the diffractive optical element on the surface to be projected is 0.093 mm in the first direction and 0.052 mm in the second direction. The oblique line actually projected onto the surface to be projected by the diffractive optical element obtained by the design method of the invention is shown in FIG. 7. After amplification, it can be clearly seen that compared with the traditional design method, the oblique line projected by the diffractive optical element designed by the design method of the invention is arranged in a regular and neat manner to greatly improve the aesthetic.

FIG. 4 shows a target pattern of an oblique line at 45°, in which a single pixel is used to form the oblique line at 45°. Those skilled in the art easily understand that the invention is not limited to this, and multiple pixels may be used to form the oblique line at 45°, such as the one shown in FIG. 8. These are all within the scope of protection of the invention.

In the above embodiment, description is made by taking the example that the first cycle d1 and the second cycle d2 satisfy $tg\theta=d1/d2$, and the invention is not limited to this. Only if the mutual proportion of the first cycle d1 to the second cycle d2 is adjusted according to the angle θ should it fall into the scope of protection of the invention.

Second Aspect

Figure 9:
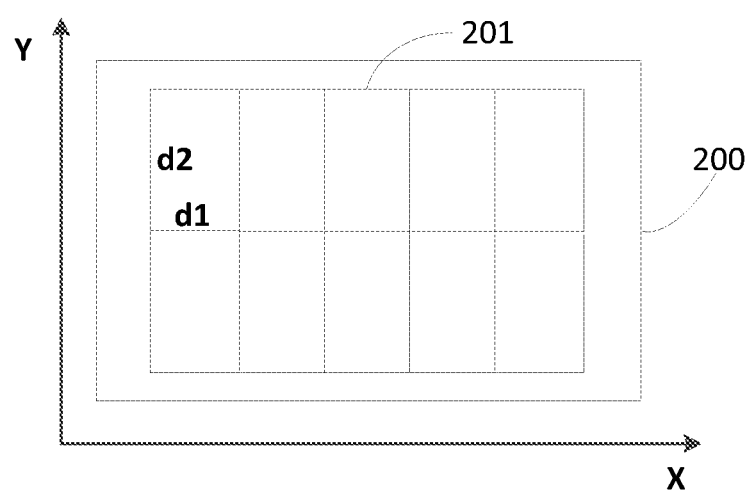
FIG. 9 shows a schematic diagram of a micro-nano structural surface of a diffractive optical element according to one embodiment of the invention.

FIG. 9 shows a diffractive optical element 200 according to one embodiment of the second aspect of the invention, which is for projecting the oblique line shown in FIG. 3, and the included angle between the oblique line and the first direction is θ (the θ, for example, does not equal to 45°). Detailed description will be made below with reference to the drawings.

The micro-nano structure surface of the diffractive optical element 200 includes a plurality of microstructure pattern units 201. The coordinate system on the micro-nano structure surface is described by the same coordinate system as shown in FIG. 3. In the embodiment of the invention, it adopts a design mode that the microstructure pattern unit 201 has different cycles in a first direction (the X-axis direction) and a second direction (the Y-axis direction) perpendicular to the same. The included angle between the oblique line in the target optical field and the first direction is θ. The cycle of the microstructure pattern unit 201 in the first direction is d1, and the cycle of the microstructure pattern unit 201 in the second direction is d2, wherein the first cycle d1 and the second cycle d2 satisfy tgθ=d1/d2. The diffractive optical element is designed according to the first cycle d1, the second cycle d2 and a target pattern with an oblique line at 45° (which is single-pixel or multi-pixel), so as to obtain a diffractive optical element suitable for the invention.

Figure 8:
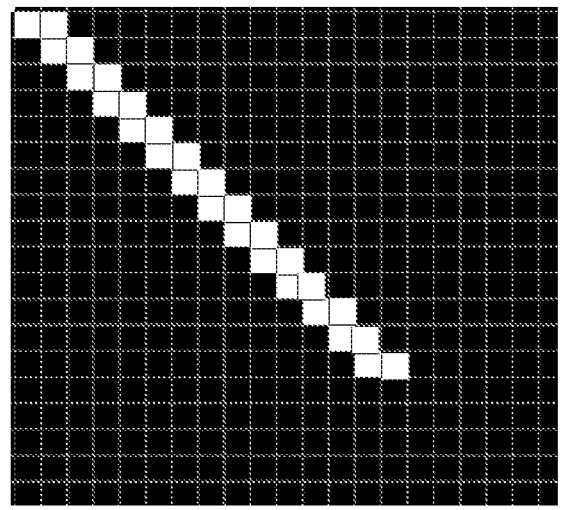
FIG. 8 shows a target pattern where multiple pixels are used to form the oblique line at 45°.

Like the first aspect above, multiple pixels may also be used to form the oblique line at 45°, such as the one shown in FIG. 8. These are all within the scope of protection of the invention.

Figure 10:
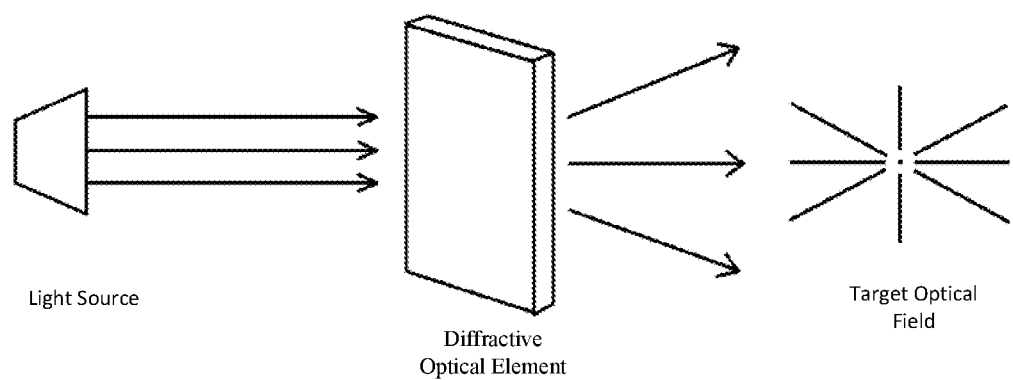
FIG. 10 shows a projection apparatus according to one embodiment of the invention.

FIG. 10 shows a projection apparatus according to one embodiment of the invention. A diffractive optical element as described above may be provided in the projection apparatus. The projection apparatus further comprises a light source, wherein the light source emits a light beam, the diffractive optical element receives the light beam downstream of the light source, and projects an oblique line not at 45° in a target optical field. With the diffractive optical element designed by the invention, patterns with different point spacings in the first and second directions can be obtained, and then a uniform oblique line at different angles can be modulated and simulated. Among them, the light source may be a collimated light source or a divergent light source, and the corresponding diffractive optical element may be designed for a collimated light source or a divergent light source. One preferred embodiment of the projection apparatus is a laser scanning gun.

The diffractive optical element design method, diffractive optical element, and projection device according to the invention are described above. The diffractive optical element obtained according to one embodiment of the invention can project an oblique line at any angle without an obvious sawtooth shape, which is uniform in brightness and is arranged in a neat and regular manner to greatly improve the aesthetic.

Described above are only the preferred embodiments of the invention, which are not intended to limit the invention. Any modification, equivalent replacement, improvement, etc. made within the spirit and principles of the invention shall be included in the scope of protection of the invention. Finally, it should be noted that described above are only the preferred embodiments of the invention, which are not used to limit the invention. Although the invention is described in detail with reference to the above embodiments, those skilled in the art could still modify the technical solutions recorded in the above embodiments or replace some of the technical features equally. Any modification, equivalent replacement, improvement, etc. made within the spirit and principles of the invention shall be included in the scope of protection of the invention.

We claim:

1. A design method for a diffractive optical element for projecting an oblique line, comprising:
   determining an angle θ between the oblique line and a first direction;
   determining, according to the angle, a first cycle d1 of the diffractive optical element in the first direction and a second cycle d2 of the diffractive optical element in a second direction, wherein the first direction is perpendicular to the second direction; and
   obtaining a phase distribution map of the diffractive optical element according to the first cycle d1, the second cycle d2 and a target pattern with an oblique line at 45°.

2. The design method according to claim 1, wherein the oblique line at 45° is a single-pixel or multi-pixel oblique line.

3. The design method according to claim 1, wherein the angle θ does not equal to 45°.

4. The design method according to claim 1, wherein the first cycle d1 and the second cycle d2 satisfy tgθ=d1/d2.

5. A diffractive optical element for projecting an oblique line, wherein an angle between the oblique line and a first direction is θ, the diffractive optical element comprising:
   a plurality of microstructure pattern units cyclically arranged in the first direction and a second direction, wherein the first direction is perpendicular to the second direction, a cycle of the microstructure pattern units in the first direction is d1, a cycle of the microstructure pattern units in the second direction is d2, and the first cycle d1 and the second cycle d2 are determined according to the angle,
   wherein a phase distribution map of the diffractive optical element is designed according to the first cycle d1, the second cycle d2 and a target pattern with an oblique line at 45°.

6. The diffractive optical element according to claim 5, wherein the oblique line at 45° is a single-pixel or multi-pixel oblique line.

7. The diffractive optical element according to claim 5, wherein the angle θ does not equal to 45°.

8. The diffractive optical element according to claim 5, wherein the first cycle d1 and the second cycle d2 satisfy tgθ=d1/d2.

9. A projection apparatus, comprising:
   a light source configured to emit a light beam;
   a diffractive optical element, wherein the diffractive optical element is disposed downstream of the light source and receives the light beam, modulates the light beam and projects a pattern comprising an oblique line, an angle between the oblique line and a first direction is θ, the diffractive optical element comprising:
   a plurality of microstructure pattern units cyclically arranged in the first direction and a second direction, wherein the first direction is perpendicular to the second direction, a cycle of the microstructure pattern units in the first direction is d1, a cycle of the microstructure pattern units in the second direction is d2, and the first cycle d1 and the second cycle d2 are determined according to the angle, wherein a phase distribution map of the diffractive optical element is designed according to the first cycle d1, the second cycle d2 and a target pattern with an oblique line at 45°.

10. The projection apparatus according to claim 9, wherein the oblique line is a single-pixel or multi-pixel oblique line.

11. The projection apparatus according to claim 9, wherein the projection apparatus is a laser scanning gun.

12. The projection apparatus according to claim 9, wherein the oblique line at 45° is a single-pixel or multi-pixel oblique line.

13. The projection apparatus according to claim 9, wherein the angle θ does not equal to 45°.

14. The projection apparatus according to claim 9, wherein the first cycle d1 and the second cycle d2 satisfy tgθ=d1/d2.

\* \* \* \* \*